United States Patent
Eastham et al.

(10) Patent No.: US 8,380,676 B1
(45) Date of Patent: Feb. 19, 2013

(54) AUTOMATIC DELETION OF TEMPORARY FILES

(75) Inventors: Paul C. Eastham, Mountain View, CA (US); Nahush Mahajan, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 274 days.

(21) Appl. No.: 12/473,035

(22) Filed: May 27, 2009

(51) Int. Cl.
  *G06F 17/00* (2006.01)
  *G06F 7/00* (2006.01)
(52) U.S. Cl. .................. 707/662; 707/694
(58) Field of Classification Search .......... 707/694, 707/662
See application file for complete search history.

(56) References Cited

U.S. PATENT DOCUMENTS

| | | | | |
|---|---|---|---|---|
| 5,764,972 | A * | 6/1998 | Crouse et al. ................ | 1/1 |
| 7,165,059 | B1 * | 1/2007 | Shah et al. ................... | 1/1 |
| 7,765,177 | B2 * | 7/2010 | Stakutis et al. ............... | 1/1 |
| 2004/0267705 | A1 * | 12/2004 | Lemus et al. ................. | 707/3 |
| 2010/0272413 | A1 * | 10/2010 | Bhogal et al. ................ | 386/83 |

OTHER PUBLICATIONS

Ghemawat, et al., The Google File System, SOSP'03, Oct. 19-22, 2003, Bolton Landing, New York, USA., 2003.

* cited by examiner

*Primary Examiner* — Jacob F Bétit
*Assistant Examiner* — Christy Lin
(74) *Attorney, Agent, or Firm* — Honigman Miller Schwartz and Cohn LLP

(57) ABSTRACT

Methods, systems, and apparatus, including computer program products feature selecting a file in a distributed file system. The file is associated with a time to live derived from a path name for the file. The file is divided into a plurality of chunks that are distributed among a plurality of servers. Each chunk has a respective modification time indicating when the chunk was last modified. A latest respective modification time among the respective modification times of each of the plurality of chunks is selected. A determination is made as to whether an elapsed time based on the latest modification time is equal to or exceeds the time to live. Each of the chunks of the file is deleted responsive to the determination. Other embodiments of this aspect include corresponding systems, apparatus, and computer program products.

20 Claims, 6 Drawing Sheets

AUTOMATIC DELETION OF TEMPORARY FILES

TECHNICAL FIELD

This document relates to file management in a file management system.

BACKGROUND

Computer programs executed by a computer system can create files that are no longer needed once the program has stopped execution. In some cases, a program can include code to delete files that are no longer needed once execution of the program has ceased. For example, a shut down sequence for a program can include deleting files created by the program that are no longer needed once execution of the program is complete. In some circumstances, a program may be terminated or killed before completing execution. In some circumstances, portions of code responsible for deleting files that are no longer needed once execution of the program has ceased may not be executed. The files created by the program that are no longer needed may then remain in a file system of the computer system. Such files can take up storage space of the file system even though they are no longer needed by a program. In some instances, a program can intentionally not delete a temporary file upon completion of execution so as to facilitate quicker resumption of processing upon a subsequent execution of the program. Additionally, user profiles associated with the computer system may be subject to memory storage space quotas. Unwanted files left behind by a program that are no longer needed by the program can take up a percentage of a memory storage quota space of a profile, leaving less storage space available to a user of the profile.

SUMMARY

In general, in one aspect, embodiments feature selecting a file in a distributed file system. The file is associated with a time to live derived from a path name for the file. The file is divided into a plurality of chunks that are distributed among a plurality of servers. Each chunk has a respective modification time indicating when the chunk was last modified. A latest respective modification time among the respective modification times of each of the plurality of chunks is selected. A determination is made as to whether an elapsed time based on the latest modification time is equal to or exceeds the time to live. Each of the chunks of the file is deleted responsive to the determination. Other embodiments of this aspect include corresponding systems, apparatus, and computer program products.

These and other embodiments can optionally include one or more of the following features. The time to live can be indicated by the name of a file system directory which contains the file. The path name for the file can include a plurality of segments and one of the segments can contain a textual representation of the time to live. Deleting the chunks of the file can include changing the path name of the file to a hidden name. A determination can be made at regular intervals. An indicator of the file can be added to a deleted files list. A determination can be made as to whether a file system directory in which the file had been located before deletion is empty. A modification time for the file system directory can be identified. A time to live for the file system directory can be identified. A determination can be made as to whether an elapsed time based on the modification time of the file system directory is equal to or exceeds the time to live for the file system directory. The file system directory can be deleted responsive to the determination. A prompt indicating that the elapsed time is equal to or greater than the time to live can be presented before deleting each of the file chunks. An input indicating whether or not the temporary file should be deleted can be received. The temporary file can be deleted file if the input indicates that the temporary file should be deleted. The time to live can be at least partially based on a usage percentage of a memory storage space quota associated with a profile of the distributed file system.

In general, in another aspect, embodiments feature selecting a first file chunk stored on a chunk server of a distributed file system. The first file chunk is associated with a time to live. The first file chunk is a portion of a file. The first file chunk has a modification time indicating when the first file chunk was last modified. The file associated with the first file chunk is identified. One or more additional chunk servers storing one or more additional file chunks of the file are identified. A respective modification time indicating when the chunk was last modified is identified for each of the file chunks. A latest respective modification time is selected from among the respective modification times of each of the file chunks. A determination is made as to whether an elapsed time based on the latest modification time is equal to or exceeds the time to live. Each of the file chunks is deleted responsive to the determination. Other embodiments of this aspect include corresponding systems, apparatus, and computer program products.

These and other embodiments can optionally include one or more of the following features. A request can be sent to a master server of the distributed file system in order to identify one or more additional chunk servers. A response can be received from the master server. The response can indicate the one or more additional chunk servers. An indication of the respective modification time for each of the additional file chunks can be received from the master server. A request for each of the respective modification times of the one or more additional file chunks can be sent to each of the one or more respective additional chunk servers. The time to live can be derived from a path name associated with the first file chunk. The path name associated with the first file chunk includes a plurality of segments and one of the segments contains a textual representation of the time to live. Metadata associated with the file chunks can be edited to indicate that the file chunks are deleted. Metadata stored by the master server can be edited to indicate that the file is deleted.

Implementations can provide any, all or none of the following advantages. Temporary files can be removed from a file system to create open storage space to allow for additional files to be stored by the file system. The percentage of a memory storage space quota of a file system or a profile of the file system that is used can be reduced by deleting temporary files. Temporary files created by programs that are no longer needed by the programs can be efficiently removed from a file system. Programs that create temporary files do not require extra code to ensure that all temporary files are deleted. In some implementations, when a program is killed during execution, temporary files created by the program can be efficiently removed from a file system. Empty directories of a file system can be automatically removed from the file system. Chunk servers in a distributed file system can achieve greater storage efficiency by deleting temporary file chunks and directories. A time to live for a file, file chunk, or directory can be easily identified or modified.

The details of one or more implementations are set forth in the accompanying drawings and the description below. Other features and advantages will be apparent from the description and drawings, and from the claims. A determination is made as to whether an elapsed time based on the latest modification time is equal to or exceeds the time to live. Each of the chunks of the file is deleted responsive to the determination. Other embodiments of this aspect include corresponding systems, apparatus, and computer program products.

DESCRIPTION OF DRAWINGS

Like reference symbols in the various drawings indicate like elements.

DETAILED DESCRIPTION

Figure 1:
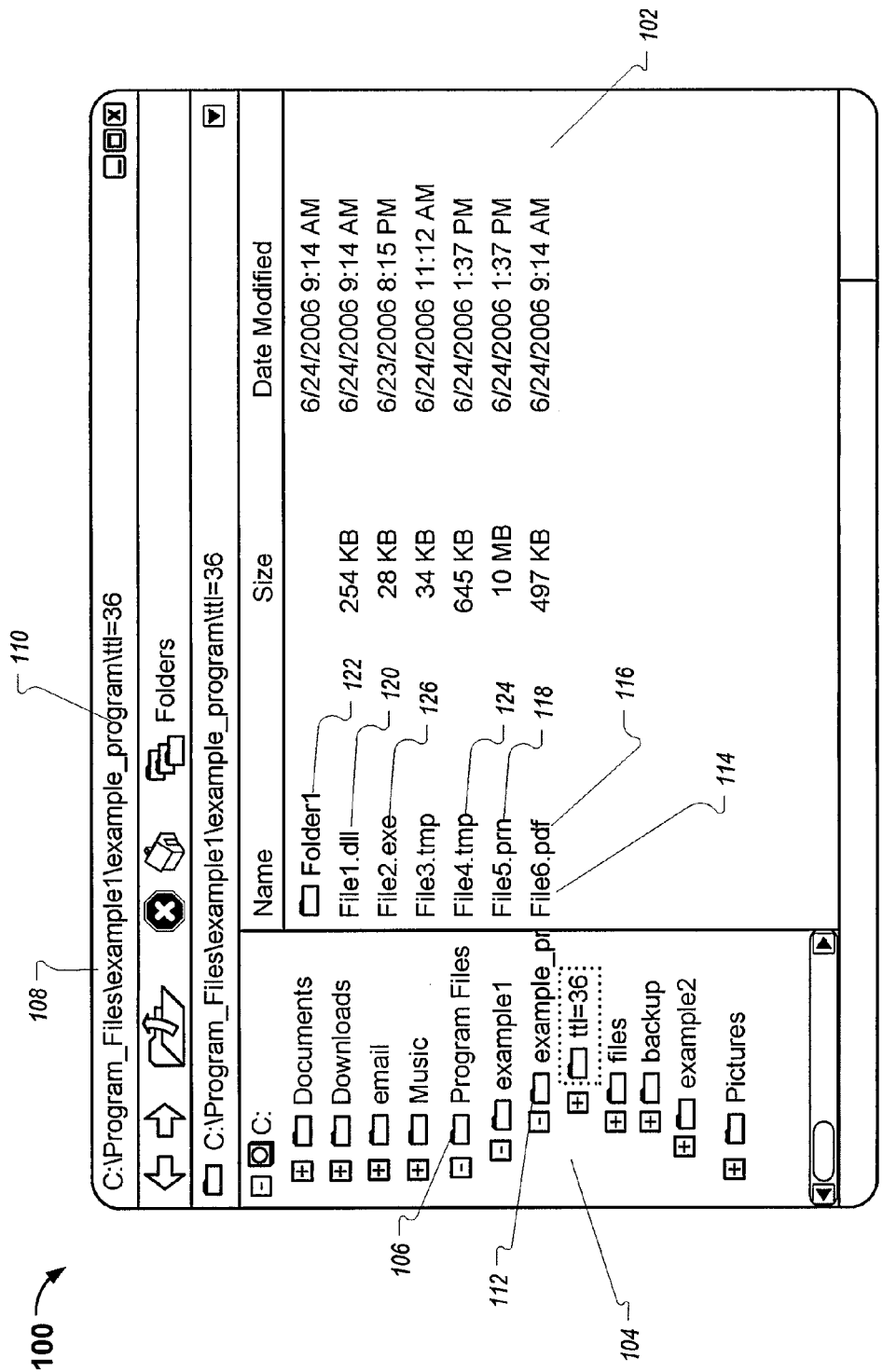
FIG. 1 shows an example of a visual display containing a file system directory.

In general, in accordance with some implementations, a file system includes a plurality of hierarchically arranged directories and files. A subset of the plurality of directories and files are identified as ephemeral files. (In some portions of the following text, files or directories for brevity will simply be referred to as files.) An ephemeral file is associated with a time to live. In some implementations, the time to live for an ephemeral file is indicated by a portion of a path name of the file. In other implementations, the time to live for an ephemeral file is indicated by metadata associated with the ephemeral file. In some implementations, metadata also indicates a last modified time of an associated ephemeral file. A deletion program for deleting ephemeral files traverses the file system in order to identify ephemeral files. The deletion program identifies the time to live and the last modified time associated with ephemeral files and calculates an elapsed time for the files by subtracting the last modified time of the files from the current time, for example. The deletion program compares the elapsed time to the time to live for the file. If the elapsed time equals or exceeds the time to live for the file, the deletion program deletes the file from the file system or causes the file to be deleted.

In further implementations, in addition to deleting an ephemeral file, the deletion program determines if a file system directory in which the ephemeral file had been located before deletion is empty. If the directory is determined to be empty, the deletion program calculates an elapsed time for the file system directory based on a last modified time associated with the file system directory, for instance. The deletion program identifies a time to live for the file system directory and compares the elapsed time for the file system directory to the time to live in order to determine if the elapsed time equals or exceeds the time to live. If the elapsed time is determined to be greater than or equal to the time to live, the deletion program deletes the file system directory.

In some implementations, the file system is a distributed file system in which some or all of the files located within the distributed file system are divided into file portions to allow the files to be stored across multiple servers. By way of illustration, a file of the distributed file system can be divided into three portions, with each of the portions being stored on a separate server. Each file portion of a file stored by the distributed file system is associated with a respective modification time that indicates a time when the portion was last modified (e.g., written to). The distributed file system can be associated with a deletion program for deleting ephemeral files as described above. The deletion program traverses hierarchically arranged directories and files of the distributed file system to identify ephemeral files.

In some implementations, upon identifying an ephemeral file, the deletion program determines a time to live associated with the ephemeral file. The deletion program also determines a last modified time for the ephemeral file by identifying a last modified time for each file portion of the ephemeral file. The deletion program then compares the last modified times of each file portion to determine a latest last modified time for the file portions. The determined latest last modified time is then associated with the ephemeral file as the last modified time of the ephemeral file. The last modified time of the ephemeral file is used to calculate an elapsed time as described above. The elapsed time is then compared to the time to live for the ephemeral file to determine if the ephemeral file has exceeded its' time to live. If the ephemeral file has exceeded its' time to live, the deletion program deletes the ephemeral file from the distributed file system or causes the file to be deleted.

Referring now to FIG. 1, in accordance with some implementations, a visual display 100 includes a visual representation of a file system directory 102 of a file system. The visual display 100 includes a navigation panel 104 which shows a plurality of directories 106 of the file system. The directories 106 displayed within the navigation panel 104 can be selected to allow a user to view files and sub-directories contained within a selected directory 106. For example, a user can select a directory 106 labeled "Documents" to view files and sub-directories contained within the Documents directory.

By way of illustration, the visual display 100 includes a title bar 108 that indicates a path name 110 associated with the file system directory 102. The path name 110 indicates the location of the file system directory 102 within the file system. The path name 110 can include the name of the file directory 102 as well as the name of the directory that contains the file system directory 102, and so on. The path name 110 can additionally include the names of subsequent hierarchically arranged directories of the file system. For example, the path name 110 indicates that the file system directory 102 is named "ttl=36" and a parent directory 112 of the file system directory 102 is named "example_program." The path name 110 further indicates that the parent directory 112 is contained within a directory named "example1" which is contained within a directory named "Program_Files" located on the "C" disk drive of the file system.

The path name 110 can be displayed elsewhere by the visual display 100. For example, the path name 110 can be displayed at the bottom of the visual display 100 or only a portion of the path name 110 may be displayed. For example, the name of the file system directory 102 can be displayed while the remainder of the path name 110 is not displayed. As another example, only the name of the parent directory 112 and the file system directory 102 can be displayed by the visual display 100. Alternatively, the path name 110 is not displayed by the visual display 100. In some implementations, the path name of a file includes a file name for the file as well as directory names of directories arranged hierarchically above the file within the file system. For example, the file system directory 102 includes a file 116 having a file name of "File6.pdf." In this example, the path name for the file 116 is "C:\Program_Files\example1\example_program\ttl=36\File6.pdf."

Still referring to FIG. 1, the visual display 100 includes a list of files and directories 114 contained within the file system directory 102. The list of files and directories 114 includes information about the files and directories contained within the file system directory 102. By way of illustration, the information displayed for each file or directory can include a name of the file or directory, an amount of storage space occupied by the file or directory, and a last modified time. The last modified time can indicate, for example, the date and time when changes were last made to the file or directory. The list of files and directories 114 can include additional information about the files and directories, such as file type, user ID of a user who created the file or directory, user ID of a user who last modified the file or directory, or a creation time of the file or directory.

In some implementations, the files contained within the file system directory 102 can be created by one or more users of the file system. For example, a first user can create the file 116 named "File6.pdf" and a second user can create a file 118 named "File5.pm" within the file system directory 102. Files contained within the file system directory 102 can also be created by one or more programs (i.e., executing software applications) running on a computer system that has access to the file system. For example, a program can create a file 120 named "File1.dll" and a directory 122 named "Folder1" within the file system directory 102. In some implementations, the files created by a user or a program are intended to be temporary files. For example, a program may create a temporary file that is used during execution of the program that is not needed once the program has finished executing. As another example, a user may create a file that includes a list of tasks to perform over a given time period. In such circumstances, the user may not need the file after the time period is over, and therefore can designate the file as a temporary file.

In some implementations, a program or a user can indicate that a file is a temporary file by including a designated character string as a portion of the name of the file. In some instances, a file name includes a designated file extension to indicate that the file is a temporary file. For example, referring to FIG. 1, a file 124 includes a file extension of ".tmp" to indicate that the file 124 is a temporary file. Following this example, in the file system represented in FIG. 1, a file extension of ".tmp" can be a reserved file extension to indicate that a file having this extension is a temporary file. In some implementations, one or more character strings can be used as portions of a file name to indicate that a file is a temporary file. For example, any file having a file name that begins with the string "temp_" can be designated as a temporary file. In this example, a directory having the name "temp_executefiles" is designated as a temporary directory. As another example, a file that has a designated string anywhere within the name of the file can be identified as temporary. Following this example, a character string of "expire" can be a designated temporary file indication string and a file with a name of "example_expire_file1.exe" can be recognized by the file system as a temporary file.

In some implementations, a program or a user can indicate that a file or directory is a temporary file or directory by including a designated character string as a portion of the path name of the file or directory. For example, a file can be identified as a temporary file if it is located in a directory having a name that includes a designated temporary indication string. For example, a designated temporary indication string for the file system is "temp." A directory of the file system can have the name "tempfolder1" to indicate that all files and subdirectories contained within the directory are temporary files and directories. In some implementations, all files and subdirectories that are located hierarchically below a directory having a name that contains a designated temporary indication string can be identified as temporary files and directories. In other implementations, only files that are located directly within a directory having a name that contains a designated temporary indication string are designated as temporary files, and files located within subdirectories of the directory having a name that contains a designated temporary indication string are not designated as temporary files.

Still referring to FIG. 1, in accordance with some implementations, that path name 110 includes a designated temporary indication string to indicate that all files and directories contained within the file system directory 102 are temporary files and directories. Additionally, in the example depicted, the path name 110 includes an indication of a time to live for the files and directories contained within the file system directory 102. The path name 110 includes the designated temporary indication string "ttl=" indicating that files arranged hierarchically below the file system directory 102 are temporary files. The path name 110 includes a character string after the designated temporary indication string to indicate a value for the time to live for the files and directories contained within the file system directory 102. In the example depicted, the time to live is indicated as 36. The time to live value can indicate a quantity of a predetermined unit of time. For example, the predetermined unit of time for the file system may be one hour. Therefore, a time to live character string of can indicate that the time to live is 36 hours. As another example, the predetermined unit of time for the file system may be one day. Therefore, a time to live character string of can indicate that the time to live is 4 days.

In some implementations, the time to live for a file can be indicated as a date. For example, a path name for a file system directory can be "C:temp\12-1-1999\" to indicate that files contained within the file system directory will expire on Dec. 1, 1999. As another example, a file system directory can have a path name of "C:temp\4-16-2003__1400" to indicate that files contained within the file system directory will expire on Apr. 16, 2003 at 2:00 pm. In some implementations, a time to live for a file can be indicated as an event. For example, a file can have a path name of "C:temp\reboot\examplefile.exe" to indicate that the file expires when a computer system associated with the file system is rebooted. As another example, a file can have a path name of "C:example_folder\quota=90\examplefile.txt" to indicate that the file expires when a memory storage space quota for the file system reaches 90%.

In some implementations, a file name portion of a path name indicates that a file is a temporary file as well as indicating a time to live for the file. For example, a file can have a path name of "F:\example2\file1_delete=48.txt." The file name portion of the path name is "file1_delete=48.txt." The file name portion includes a designated temporary indication string of "delete=" followed by a numerical character string of "48" indicating that the time to live for the file, in this example, is 48 hours.

In some implementations, the file name of a file includes an indication of a time to live and a directory arranged hierarchically above the file also includes an indication of a time to live. For example, a file can have a path name of "D:\example3\ttl=48\File3_ttl=12.exe." In some implementations, if a path name includes more than one indication of a time to live, the longest time to live is identified as the time to live for the file. Following the example above, in such implementations, the file would have a time to live of 48 hours since 48 is greater than 12. In some implementations, the shortest time to live is identified as the time to live for the file. In some implementations, the time to live indication that appears latest in a path name is identified as the time to live for the file. Following the example above, in such implementations, the time to live for the file would be identified as 12 hours since "ttl=12" appears later in the path name than "ttl=48."

In some implementations, a time to live for the temporary file can be modified by editing a path name associated with the temporary file. For example, the time to live for the file 116 can be modified by editing the path name 110. The character string in the path name 110 shown in FIG. 1 as "ttl=36" can be changed to "ttl=24" in order to change the time to live for files and directories contained within the file system directory 102 from 36 hours to 24 hours.

In some implementations, a designated temporary indication string within the path name 110 that is not followed by a string of numeric characters can indicate a default time to live for files and directories contained within the file system directory 102. For example, a designated temporary indication string for the file system can be "expire." In this example, a file or directory having a path name that includes the string "expire" is identified as a temporary file or directory. In some circumstances, the string "expire" can be followed by an equals sign and a string of numeric characters to indicate a time to live for the file or directory. For example, the string "expire" can be followed by the string "=24" to indicate a time to live of 24 hours for the file or directory. In circumstances in which the string "expire" is not followed by an equals sign and a string of numeric characters, a default time to live can be assigned to the file or directory. For example, a file path name of "c:\expire\folder\examplefile.txt" can indicate a default time to live of 12 hours.

In some implementations, metadata associated with a file can be used to indicate if a file is a temporary file. For example, a reserved mode bit or data element can be used to indicate if a file is a temporary file. If the mode bit is set to zero, the file is not a temporary file. If the mode bit is set to one, the file is designated as a temporary file. In some implementations, if the mode bit indicates that a file is a temporary file, additional metadata associated with the file can indicate a time to live for the file. In some implementations, an indicator of whether a file is a temporary file can be included in the information displayed by the list of files 114. For example, the list of files 114 can include a column indicating for each file in the file system directory 102 if the file is a temporary file. As another example, the list of files 114 can include a time to live column which indicates a time to live for each file in the file system directory 102. In this example, a time to live value of null or zero can indicate that a file is not temporary, while a value greater than zero can indicate the time to live for the file.

Still referring to FIG. 1, in accordance with some implementations, a computer system that includes the file system directory 102 includes a temporary file deletion module. The temporary file deletion module can be, for example, a computer program executed by the computer system. The temporary file deletion module can traverse the directories and files of the file system to identify temporary files. The temporary file deletion module identifies a time to live for the temporary file. In some implementations, the temporary file deletion module can parse the path name of the temporary file to identify a character string that indicates a time to live for the temporary file. For example, the path name 110 includes the character string "ttl=36" to indicate that files contained within the file system directory 102 have a time to live value of 36 hours. The temporary file deletion module can parse the path name 110 in order to extract the time to live of 36 hours from the path name 110. In other implementations, the temporary file deletion module analyzes metadata associated with the temporary file to extract a time to live. For example, the metadata associated with the temporary file can include a time to live field that indicates a time to live of two days for the temporary file. In this example, the temporary file deletion module extracts the time to live from the metadata.

In some implementations, the temporary file may not be associated with a time to live. In such circumstances, the temporary file deletion module can associate a default time to live with the temporary file. For example, the temporary file deletion module may associate a default time to live of 12 hours with any temporary file that is not explicitly associated with a time to live. In other implementations, the temporary file deletion module can automatically delete an identified temporary file that is not associated with a time to live.

The temporary file deletion module can identify a last modified time for the temporary file. The last modified time indicates the day and time when a file was last modified. In some implementations, the day is indicated by a date. For example, the file 120 has a last modified time indicated as Jun. 24, 2006 at 9:14 am. In other implementations, the day is indicated as a number of days that have elapsed since the last modified day and the current day. For example, a last modified time can indicate that a file was last modified two days ago at 9:00 am. As another example, a last modified time can indicate that a file was last modified two weeks and four days ago at 11:37 am. In some implementations, the last modified time for the temporary file is indicated by metadata associated with the temporary file. The last modified time can be a portion of the information displayed by the list of files 114 as described above. For example, as depicted in FIG. 1, the list of files 114 indicates that the file 118 has a last modified time of Jun. 24, 2006 at 1:14 pm.

In some implementations, the temporary file deletion module uses the time to live to calculate an elapsed time for the temporary file. The elapsed time represents an amount of time that has elapsed since the temporary file was last modified and can be calculated, for example, by subtracting the last modified time from the current time. By way of illustration, referring to FIG. 1, the file 120 has a last modified time of Jun. 24, 2006 at 9:14 am. If the current time is Jun. 25, 2006 at 8:30 am, then the elapsed time for the file 120 is 23 hours and 16 minutes. As another example, the file system directory includes a file 126 having a last modified time of Jun. 23, 2006 at 8:15 pm. If the current time is Jun. 25, 2006 at 8:30 am, then the elapsed time for the file 126 is 36 hours and 15 minutes.

In some implementations, the elapsed time for the temporary file is stored as metadata associated with the temporary file. For example, metadata associated with the file 116 can indicate that 27 hours and 12 minutes have elapsed since the file 116 was last modified. In such circumstances, the temporary file deletion module does not need to extract a last modified time in order to calculate an elapsed time for the temporary file. The temporary file deletion module can simply extract the elapsed time from the metadata associated with the temporary file. In some implementations, the elapsed time is calculated based on a creation time of the temporary file rather than the last modified time of the temporary file. In such instances, the elapsed time is calculated by subtracting the creation time of the temporary file from the current time.

In some implementations, once the temporary file deletion module has calculated or identified an elapsed time for the temporary file, the temporary file deletion module compares the elapsed time to the time to live associated with the temporary file to determine if the elapsed time is greater than the time to live. If the elapsed time is greater than the time to live for the temporary file, the temporary file deletion module can delete the temporary file or cause the temporary file to be deleted. For example, as depicted in FIG. 1, if the current time is Jun. 25, 2006 at 8:30 am, the elapsed time for the file 120 is 23 hours and 16 minutes. Following this example, the path name 110 includes the string "ttl=36" indicating that the time to live for files contained within the file system directory 102 is 36 hours. Since the elapsed time of 23 hours and 16 minutes is less than the time to live of 36 hours, the temporary file deletion module determines that the file 120 has not exceeded its time to live and the temporary file deletion module will therefore not delete the file 120. As another example, still referring to FIG. 1, if the current time is Jun. 25, 2006 at 8:30 am, the elapsed time for the file 126 is 36 hours and 15 minutes. The path name 110 includes the string "ttl=36" indicating that the time to live for files contained within the file system directory 102 is 36 hours. Since the elapsed time of 36 hours and 15 minutes is greater than the time to live of 36 hours, the temporary file deletion module determines that the file 126 has exceeded its time to live. The temporary file deletion module can subsequently delete the file 126 or cause the file 126 to be deleted.

In some implementations, a file can be designated a protected or frozen file. In some implementations, metadata associated with a file indicates that the file is a protected file. For example, metadata associated with a file can include a protected file bit. If the protected file bit is set to 1, the file is a protected file. If the protected file hit is set to 0, the file is not a protected file. In other implementations, a designated character string indicates that a file is a protected file. For example, a string of "frozen" in a file name or path name of a file can indicate that the file is a protected file. Following this example, a file having a file name of "examplefile1_frozen.txt" would be a protected file. In some implementations, a protected file is not deleted even if the file has exceeded its time to live. For example, a file can have a path name of "F:\files\ttl=24\example_save.txt." In this example, the character string "ttl=24" indicates that the time to live for files contained within the "ttl=24" directory is 24 hours and the character string of "save" indicates that a file is a protected file. In this example, the file will not be deleted even if an elapsed time for the file exceeds 24 hours since the path name of the file includes the character string "save" therefore indicating that the file is a protected file. As another example, metadata associated with a file can indicate that the file is a protected file. In this example, the file will not be deleted even if it exceeds a time to live indicated by metadata or a path name associated with the file.

In some implementations, a time to live for a file can be partially based on a usage percentage of a memory storage space quota associated with a user profile of the file system. The file system can have a plurality of users, with each user having a profile with an assigned memory storage space quota. For example, a first user can be using 20% of the memory storage space quota assigned to the first user's profile. A second user can be using 70% of the memory storage space quota assigned to the second user's profile. Temporary files associated with the first user's profile can be associated with a longer time to live than temporary files associated with the second user's profile since the first user is using a lower percentage of the memory storage space quota than the second user. In some implementations, the percentage of memory storage space quota used by a profile is used to calculate the time to live associated with temporary files associated with the profile. For example, a natural time to live for the file system can be 48 hours. A time to live for files associated with a profile is calculated by multiplying by the percentage of memory storage space quota used by the profile to get a weighted quota penalty value. The weighted quota penalty value is then subtracted from the natural time to live of 48 hours to get an actual time to live. In this example, it can be seen that a profile that is using 100% of its memory storage space quota will have an actual time to live of 0 hours. Therefore temporary files associated with the profile will be deleted upon detection by the temporary file deletion module regardless of the elapsed times associated with the temporary files.

In some implementations, the amount of memory storage space that is counted towards a percentage of memory storage space quota used is reduced for files that are indicated as temporary files. For example, referring to FIG. 1, the files contained within the file system directory 102 can be indicated as temporary files by the path name 110 as described above. As shown in the example depicted, the file 118 has a size of 10 MB. Since the file 118 is indicated as a temporary file, the memory storage space for the file 118 that is counted towards the percentage of memory storage space quota used can be less than 10 MB. For example, the file system may designate that only half of the file size of a temporary file is counted towards the percentage of memory storage space quota used. In this example, the amount of memory storage space that would count towards the percentage of memory storage space quota used for the file 118 is 5 MB.

In some implementations, the temporary file deletion module is run at regular intervals. For example, the temporary file deletion module can be executed by the computer system every 12 hours. As another example, the temporary file deletion module can be executed every day at a specified time. As yet another example, the temporary file deletion module can be executed as part of a boot up, power down, sleep, or hibernation sequence of the computer system. In some implementations, the temporary file deletion module is executed whenever a percentage of memory storage space quota used for a profile meets or exceeds a predetermined threshold (e.g. 90%).

In some implementations, upon identifying a temporary file having an elapsed time that is greater than a time to live associated with the temporary file, the temporary file deletion module deletes the temporary file by removing the temporary file from the file system. In some implementations, the temporary file deletion module deletes the temporary file by moving the temporary file from the file system directory 102 and placing the temporary file in a deleted files directory. For example, the file system can include a directory named "temp_deleted_files." The temporary file deletion module can delete the temporary file by moving the temporary file to the temp_deleted_files directory. This can allow a user to access and retrieve a temporary file that has been deleted. For example, a user of the file system may have accidentally marked the deleted file as a temporary file while actually intending for the deleted file to be a permanent file. By placing the deleted file in the temp_deleted_files directory, the temporary file deletion module allows the user to retrieve the deleted file and designate the file as a permanent file. In some implementations, deleted files that are placed in the deleted file directory are permanently deleted after a set time period. For example, once a temporary file has been placed in the deleted files directory, the file can be permanently deleted if it has not been removed from the deleted files directory after three days.

In some implementations, upon identifying a temporary file having an elapsed time that is greater than a time to live associated with the temporary file, the temporary file deletion module deletes the temporary file by changing the path name of the temporary file to a hidden name. For example, a directory can have a directory name of " . . . " to indicate that the directory is a hidden directory. The temporary file deletion module deletes the temporary file by placing the temporary file in the hidden directory, thereby changing the path name of the temporary file to a hidden path name. In some implementations, the file name of the temporary file is changed to a hidden name to indicate that the temporary file is a hidden file without moving the temporary file into a different directory. In some instances, a deletion time stamp is associated with the temporary file indicating the date and time when the path name of the temporary file was changed to a hidden name.

As described above for the deleted files directory, changing the path name of the temporary file to a hidden name can allow a user to access and retrieve the temporary file after it has exceeded its time to live. In some implementations, the temporary file is permanently deleted from the file system if a predetermined amount of time has elapsed in which the hidden name of the temporary file has not been changed to a non-hidden name. For example, referring to FIG. 1, the temporary file deletion module can determine that the file 118 has an elapsed time that is greater than a time to live associated with the file 118. The temporary file deletion module can delete the file 118 by changing the path name of the file 118 to a hidden name. If the hidden name of the file 118 has not been changed to a non-hidden name after a predetermined period of time has elapsed, the file 118 is permanently deleted from the file system.

In some implementations, upon deleting a temporary file, the temporary file deletion module adds information associated with the temporary file to a deleted files list. The information added to the deleted files list can include a file name, a path name, a file size, a file type, a last modified time, a created time, a created by user ID, a last modified by user ID, a time to live, or a deletion time for the temporary file. The deleted files list allows programs or users to identify files that have been deleted by the temporary file deletion module. In some implementations, the temporary file deletion module generates and displays a prompt indicating that the temporary file has exceeded its time to live. For example, if the file 124 has exceeded its time to live, the temporary file deletion module can display a prompt to a user of the file system indicating that the file 124 has exceeded its time to live and is about to be deleted.

In some implementations, the temporary file deletion module uses the prompt to elicit input (e.g. user input in the form of mouse or keyboard strokes) to indicate whether or not the temporary file should be deleted. The temporary file deletion module can delete the temporary file if the input indicates that the temporary file should be deleted, and not delete the file if the input indicates that the temporary file should not be deleted. In some implementations, the temporary file deletion module automatically deletes the temporary file if input has not been received after a predetermined period of time. For example, if the file 116 has exceeded its time to live, the temporary file deletion module displays a prompt to a user of the file system indicating that the file 116 has exceeded its time to live and asking the user to indicate if the file 116 should be deleted. If the user does not provide input indicating whether or not the file 116 should be deleted within five minutes of the prompt being displayed, the temporary file deletion module can automatically delete the file 116.

In some implementations, after a temporary file has been deleted, the temporary file deletion module determines if a file system directory in which the temporary file had been located before deletion is empty. For example, referring to FIG. 1, the temporary file deletion module can delete a temporary file located within the directory 122. The temporary file deletion module then checks for other files located within the directory 122. If no other files are located within the directory 122, the temporary file deletion module determines that the directory 122 is empty. If the directory is determined to be empty, the temporary file deletion module can calculate an elapsed time for the directory based on a last modified time associated with the file system directory. Following the example above, the temporary file deletion module can identify the last modified time for the directory 122 as Jun. 24, 2006 at 9:14 am. If the current time is Jun. 25, 2006 at 10:00 pm, the elapsed time for the directory 122 is 36 hours and 46 minutes. In some implementations, the last modified time of the directory is not changed when a contained within the directory is deleted by the temporary file deletion module.

The temporary file deletion module can identify a time to live for the file system directory and compare the elapsed time for the file system directory to the time to live to determine if the elapsed time equals or exceeds the time to live. Following the example above, the time to live for the directory 122 contained within the file system directory 102 is 36 hours as indicated by the path name 110. Since the elapsed time for the directory 122 in this example is 36 hours and 46 minutes, the elapsed time is greater than the time to live for the directory 122. If the elapsed time is determined to be greater than or equal to the time to live, the temporary file deletion module deletes the directory (e.g. the directory 122 in the above example).

Figure 2:
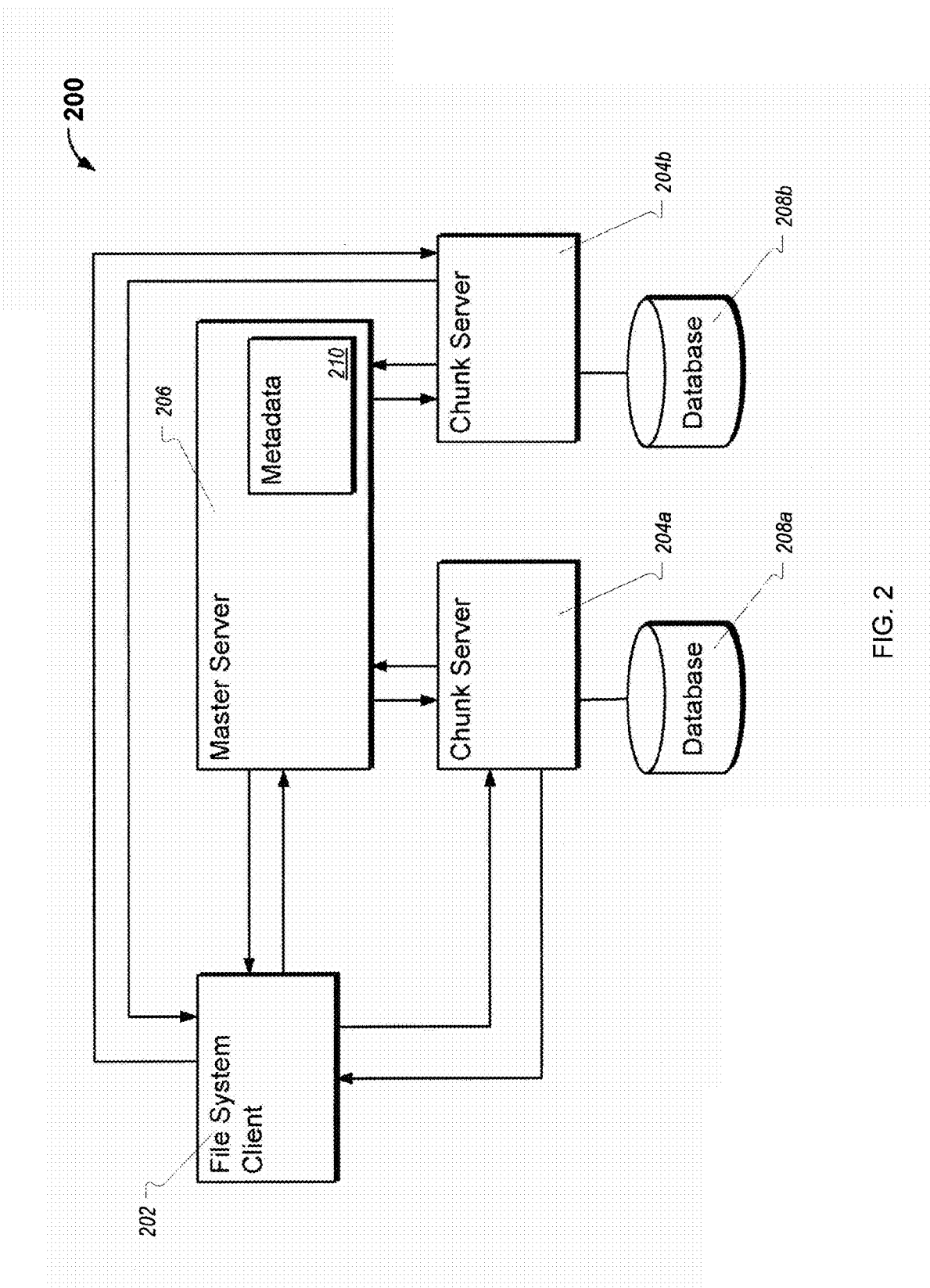
FIG. 2 shows an example of a distributed file system.

Referring now to FIG. 2, in accordance with some implementations, a distributed file system 200 includes a file system client 202. The file system client 202 allows users and programs to access files stored by the distributed file system 200. The distributed file system 200 can store files in a hierarchically arranged manner. At least a portion of the files stored by the file distribution system 200 are divided into a plurality of file chunks. The file chunks can be stored on a plurality of different chunk servers 204. In some implementations, the file chunks are replicated to create back-up file chunks. The back-up file chunks are stored on chunk servers 204 that are distinct from the chunk servers 204 storing the original file chunks in order to provide redundancy in the distributed file system 200 in the case that one or more of the chunk servers 204 fails or one or more of the original file chunks becomes corrupted.

In some implementations, the file system client 202 can access a file that has been divided into a plurality of file chunks stored on a plurality of servers by contacting a master server 206. The file system client 202 sends a request to the master server 206 requesting identifying information for file chunks of the file and chunk servers storing the file chunks. The master server 206 sends a response to the file system client 202 that includes information associated with the file chunks of the file. The information in the response can include the number of file chunks that the file has been divided into, chunk handles for each of the file chunks, or server IDs for the chunk servers where the file chunks are stored. The file system client 202 can then communicate with the identified chunk servers in order to retrieve the identified file chunks.

For example, referring to FIG. 2, the file system client 202 sends a request for information associated with file chunks of a file to the master server 206. The master server 206 sends a response to the file system client indicating that the file is divided into first and second file chunks. The response further indicates chunk handles associated with each of the file chunks and indicates that the first file chunk is located on a chunk server 204a and the second file chunk is located on a chunk server 204b. The file system client 202 sends a request to the chunk server 204a that includes the chunk handle for the first file chunk. The file system 202 sends a second request to the chunk server 204b that includes the chunk handle for the second file chunk. In some implementations, the chunk servers 204a-b access databases 208a-b respectively to retrieve the first and second file chunks. Still following this example, the chunk server 204a provides the first file chunk to the file system client 202 and the chunk server 204b provides the second file chunk to the file system client 202.

In some implementations, reads and writes of the file chunks are performed directly by the chunk servers 204 without further communication with the master server 206. In some implementations, when changes are made to a file chunk, the chunk server 204 on which the file chunk is stored communicates with the master server 206 so that the master server 206 can update metadata 210 associated with the file chunk. For example, if a file chunk stored by the chunk server 204a is deleted, the chunk server 204a can indicate to the master server 206 that the file chunk has been deleted. The master server 206 can update metadata 210 associated with the file chunk to indicate that the file chunk has been deleted. As another example, if a write has been preformed for a file chunk stored by the chunk server 204b, the chunk server 204b sends to the master server 206 an indication that the file chunk has been modified and an indication of the time that the file chunk was modified. The master server 206 then edits metadata associated with the file to indicate the modification time received from the chunk server 204b as the last modified time for the file chunk.

Still referring to FIG. 2, in accordance with some implementations, a portion of the files associated with the distributed file system 200 are temporary files. Each temporary file can be associated with a time to live as described above with reference to FIG. 1. For example, a time to live for a temporary file can be derived from a path name associated with the file as described above. As another example, a time to live for a temporary file can be stored as metadata associated with the file. For example, the metadata 210 stored on the master server 206 that is associated with a file can indicate that the file is a temporary file and further indicate a time to live for the file.

In some implementations, the distributed file system includes a temporary file deletion module. The temporary file deletion module can be, for example, a computer program executed by the master server 206. In other implementations, the temporary file deletion module is a computer program executed by the file system client 202. The temporary file deletion module can traverse files of the distributed file system 200 in order to identify temporary files of the distribute file system 200. For example, the temporary file deletion module can traverse a table of file names which covers a file namespace of the distributed file system 200. The temporary file deletion module can access each file, or data associated with each file to identify temporary files. As another example, the temporary file deletion module can traverse through hierarchically arranged files and directories in order to identify temporary files of the distributed file system 200. The temporary file deletion module can identify a file that is stored as a plurality of file chunks located on a plurality of chunk servers by the distributed file system 200 as a temporary file. The temporary file deletion module can determine a time to live for the file as described above. For example, the temporary file deletion module can identify a character string contained within the path name of the file in order to determine a time to live for the file. Following this example, a character string of "ttl=5" contained within the path name of the file may indicate that the time to live for the file is five days.

In some implementations, the temporary file deletion module identifies a last modified time for the file. The temporary file deletion module can identify the last modified time for the file by determining a last modified time for each file chunk of the file. In some implementations, the last modified time for each file chunk is stored as part of the metadata 210 stored on the master server 206. The temporary file deletion module can request the last modified time for each of the plurality of file chunks from the master server 206. The master server 206 can retrieve the last modified time for each file chunk from the metadata 210 and provide the last modified times to the temporary file deletion module. In some implementations, the temporary file deletion module compares the last modified times for the plurality of file chunks to determine a latest last modified time from among the last modified times. For example, if a file is divided into three file chunks, the master server can indicate that the three file chunks have modification times of 9:30 am, 10:20 am, and 1:30 pm on the current day. The temporary file deletion module compares the three modification times to determine that 1:30 pm is the latest modification time. The latest last modified time is then associated with the file as the last modified time for the file.

For example, the temporary file deletion module can be executed by the file system client 202. The temporary file deletion module traverses files of the distributed file system 200 until it identifies a file as a temporary file. The temporary file deletion module extracts a time to live for the file as described above and sends a request to the master server 206 requesting last modified times for file chunks of the file. The master server 206 retrieves the last modified time for each file chunk from the metadata 210. The master server 206 sends a response to the file system client 202 indicating the last modified time for each of the file chunks. The temporary file deletion module compares the last modified times for the file chunks to determine which of the last modified times is the latest last modified time. The temporary file deletion module then associates the latest last modified time with the file as the last modified time for the file.

Still referring to FIG. 2, in some implementations last modified times for file chunks may not be stored by the master server 206 or last modified times for file chunks stored by the master server 206 as metadata 210 may be incorrect. In such circumstances, the temporary file deletion module can retrieve the last modified time for each file chunk of a file by contacting the corresponding chunk servers 204 where the file chunks are located. In some implementations, upon identifying a file as a temporary file, the temporary file deletion module contacts the master server 206 to request handles for file chunks of the file and server IDs for the chunk servers 204 where the file chunks are located. The master server 206 retrieves the chunk handles for the file chunks and the server IDs for the chunk servers 204 from the metadata 210 and provides the information to the temporary file deletion module. The temporary file deletion module then communicates with the chunk servers 204 indicated by the received server IDs to request last modified times for the file chunks. The temporary file deletion module indicates to the chunk servers the chunk handles of the file chunks. The chunk servers 204 can use the chunk handles to retrieve the last modified times for the file chunks and provided the last modified times to the temporary file deletion module. For example, the temporary file deletion module can send a request to the chunk server 204a that includes a chunk handle for a file chunk located on the chunk server 204a. The chunk server 204a can then retrieve the last modified time for the file chunk and provide the last modified time to the temporary file deletion module. The temporary file deletion module can compare the last modified times of the file chunks to determine a latest last modified time from among the last modified times. The temporary file deletion module then associates the latest last modified time with the file as the last modified time for the file.

In some implementations, upon determining a last modified time for a temporary file, either by one of the methods described above or through other means, the temporary file deletion module uses the last modified time for the temporary file to calculate an elapsed time for the temporary file. The elapsed time is calculated by subtracting the last modified time of the temporary file from the current time. For example, if a file has a last modified time of Apr. 7, 2004 at 3:00 pm and the current time is Apr. 9, 2004 at 11:17 am, the elapsed time for the file is 1 day, 20 hours and 17 minutes. The temporary file deletion module then compares the elapsed time for the temporary file to the time to live for the temporary file to determine if the elapsed time equals or exceeds the time to live.

In some implementations, upon determining that a temporary file has an elapsed time that is greater than or equal to a time to live for the temporary file, the temporary file deletion module deletes the file or causes the file to be deleted. In some implementations, the temporary file is deleted by deleting each file chunk of the temporary file. For example, a temporary file is divided into two file chunks that are stored on chunk servers 204a-b. The temporary file deletion module can determine that the temporary file has exceeded its time to live. The file is deleted by deleting each of the file chunks from the chunk servers 204a-b. In some implementations, an indication that the file has been deleted is provided to the master server 206. For example, the temporary file deletion module can indicate to the master server 206 that a temporary file has been deleted. The master server 206 can then edit metadata 210 associated with the temporary file to indicate that the temporary file is deleted. In some implementations, each chunk server 204 on which a file chunk of the deleted temporary file had been located sends an indication to the master server 206 that the file chunks have been deleted. For example, if a file chunk stored by the chunk server 204b is deleted, the chunk server 204b indicates to the master server 206 that the file chunk has been deleted. The master server then edits metadata 210 associated with the file chunk to indicate that the file chunk is deleted. In some implementations, if the master server 206 determines that all of the file chunks of a file are deleted, then the master server 206 can determine that the file is deleted. In such circumstances, the master server 206 can edit metadata 210 associated with the file to indicate that the file is deleted.

In some implementations, upon determining that a temporary file has an elapsed time that is greater than or equal to a time to live for the temporary file, the master server is updated to indicate that the temporary file is deleted; however, file chunks associated with the temporary file are not immediately deleted. Updating the master server to indicate that the temporary file is deleted can include deleting an indication of the temporary file, editing metadata associated with the temporary file to indicate that the temporary file is deleted, or deleting references to file chunks associated with the temporary file. In some implementations, the temporary file deletion module, or another separate module can traverse chunk servers to perform a reference check for file chunks stored on the file server. The reference check can determine if a file chunk is referred to by any files. If there are no files that refer to the file chunk, the file chunk is deleted.

For example, the temporary file deletion module can determine that a file has exceeded its time to live. The temporary file deletion module can edit metadata 210 stored on the master server 206 to remove references to file chunks associated with the file. Following this example, the temporary file deletion module, or another separate module, can perform a reference check for a file chunk that had been associated with the file. The reference check can identify that there are no files that point to the file chunk. The file chunk is then deleted.

In some implementations, the reference check can determine if a file chunk is referred to by a file that is indicated as a deleted file. If the file chunk is only referred to by one or more deleted files and no non-deleted files, the file chunk is deleted. For example, the temporary file deletion module can determine that an elapsed time associated with a file is greater than a time to live for the file. The temporary file deletion module can edit metadata 210 stored on the master server 206 to indicate that the file is a deleted file. Following this example, the temporary file deletion module, or another separate module, can perform a reference check for a file chunk that had been associated with the file. The reference check can identify that only files that are indicated as deleted files point to the file chunk. The file chunk is then deleted.

In some implementations, upon deleting a temporary file or a file chunk, information associated with the temporary file or file chunk is added to a list of deleted files. The information added to the list of deleted files can include a file name, a path name, chunk handles of associated file chunks, chunk servers of associated file chunks, a file size, a file type, a last modified time, a created time, a created by user ID, a last modified by user ID, a time to live, or a deletion time for the temporary file or file chunk. The list of deleted files can allow programs or users of the distributed file system 200 to identify files and file chunks that have been deleted by the temporary file deletion module.

In some implementations, the temporary file deletion module deletes a file or file chunk by removing the file or file chunk from the file system. In some implementations, the temporary file deletion module deletes a file or file chunk by placing the file or file chunk in a deleted files directory. For example, the distributed file system 200 can include a directory named "temp_deleted_files." The temporary file deletion module can delete a file chunk by moving the file chunk to the temp_deleted_files directory. This allows a user to access and retrieve a file or file chunk that has been deleted. In some implementations, deleted files or file chunks that are placed in the deleted file directory are permanently deleted after a set time period. For example, once a file chunk has been placed in the deleted files directory, the file chunk can be permanently deleted if it has not been removed from the deleted files directory after three days.

In some implementations, the temporary file deletion module deletes a file or file chunk by changing the path name of the file or file chunk to a hidden name. For example, a directory can have a directory name of " . . . " to indicate that the directory is a hidden directory. The temporary file deletion module deletes a file or file chunk by placing the file or file chunk in the hidden directory, thereby changing the path name of the file or file chunk to a hidden path name. In some implementations, the file name of a file or file chunk is changed to a hidden name to indicate that the temporary file or file chunk is a hidden file or file chunk without moving the file or file chunk into a different directory. For example, a designated character or string of characters placed at the beginning of a file name can indicate that the file is a hidden file. An example of a designated hidden file character could be "~". In this example, changing the name of a file from "file1.exe" to "~file1.exe" would change the file to a hidden file. In some instances, a deletion time stamp is associated with the file or file chunk indicating the date and time when the path name of the temporary file was changed to a hidden name. In some implementations, a file or file chunk is permanently deleted from the file system if a predetermined amount of time has elapsed in which a hidden name of the file or file chunk has not been changed to a non-hidden name.

Still referring to FIG. 2, in some implementations, a temporary file deletion module can act upon a chunk server 204. For example, the temporary file deletion module can be a program that is executed by the chunk server 204a. As another example, the temporary file deletion module can be a program that is executed by the file system client 202 to act upon file chunks stored by the chunk server 204b. In such implementations, the temporary file deletion module can analyze the file chunks stored by a chunk server 204 in order to identify temporary file chunks. File chunks stored on the chunk server 204 can be designated as temporary file chunks as described above for files designated as temporary files. For example, a path name associated with a file chunk can include a character string that is a designated temporary indication string to indicate that the file chunk is a temporary file chunk. In some implementations, the path name is the path name for the file chunk. In some implementations, the path name is the path name for a file that the file chunk is a portion of. As another example, metadata (e.g. a mode bit) associated with the file chunk indicates that the file chunk is a temporary file chunk.

Upon identifying a file chunk as a temporary file chunk, the temporary file deletion module can identify a time to live for the file chunk. In some implementations, the time to live for the file chunk is extracted from a path name associated with the file chunk as described above with reference to FIG. 1. For example, the path name of a file with which the file chunk is associated can include an indication of a time to live. In other implementations, the time to live for the file chunk is extracted from metadata associated with the file chunk. For example, the time to live for the file chunk can be stored by the master server 206 as part of the metadata 210. The temporary file deletion module requests the time to live for the file chunk from the master server 206. The master server 206 retrieves the time to live for the file chunk from the metadata 210 and provides the time to live to the temporary file deletion module. As another example, metadata stored by the chunk server on which the file chunk is located indicates a time to live for the file chunk.

In some implementations, the file chunk is associated with a last modified time. The last modified time can be stored as metadata associated with the file chunk. In some implementations, metadata that indicates a last modified time is stored by the chunk server on which the file chunk is located. In other implementations, the master server 206 stores metadata 210 that indicates a last modified time for the file chunk. In some implementations, the last modified time for the file chunk is stored by both the master server 206 and the chunk server on which the file chunk is located.

Still referring to FIG. 2, in accordance with some implementations, the file chunk is associated with a file that has been divided into a plurality of file chunks. The temporary file deletion module can obtain chunk handles and server IDs associated with additional file chunks of the file. For example, the temporary file deletion module sends a request to the master file server 206 that includes a chunk handle for the file chunk. The master server 206 uses the chunk handle to identify the file associated with the file chunk. The master server 206 then identifies additional file chunks that are associated with the file The master server 206 provides a response to the temporary file deletion module that indicates chunk handles for each of the additional file chunks and server IDs for the chunk servers on which the additional file chunks are located.

In some implementations, the temporary file deletion module identifies a last modified time for each of the additional file chunks. For example, the master server 206 provides last modified times for each of the additional file chunks to the temporary file deletion module. In some implementations, the master server 206 includes a last modified time for each of the additional file chunks in the above mentioned response that includes the chunk handles for each of the additional file chunks and the server IDs for the chunk servers on which the additional file chunks are located. In some implementations, the temporary file deletion module sends a separate request to the master server 206 requesting last modified times for each of the additional file chunks. The request can include the chunk handle for each of the additional file chunks. The master server 206 may store the last modified time for each of the additional file chunks as metadata 210. In response to the request, the master server 206 provides the last modified times to the temporary file deletion module.

In some implementations, the last modified time for each of the additional file chunks is stored by the chunk server on which the file chunk is located. In such circumstances, the temporary file deletion module can obtain the last modified times from the chunk server. In some implementations, the temporary file deletion module uses the server IDs for the chunk servers on which the additional file chunks are located to send a request to each of the chunk servers requesting a last modified time for the additional file chunk stored on each respective chunk server. For example, referring to FIG. 2, if the file chunk is stored by the chunk server 204a and one of the additional file chunks is stored by the chunk server 204b, the temporary file deletion module sends a request to the chunk server 204b using the server ID for the chunk server 204b. The request includes the chunk handle for the additional file chunk stored by the chunk server 204b. The chunk server 204b uses the chunk handle to identify the additional file chunk and extract a last modified time for the additional file chunk. The chunk server 204b then provides the last modified time for the additional file chunk to the temporary file deletion module.

In some implementations, some of the chunk servers on which additional file chunks are located may not respond to the temporary file deletion module's request for a last modified time of an additional file chunk. In some implementations, the temporary file deletion module triggers a time out for a last modified time request if a response has not been received within a specified time period. If a response is not received with in the specified time period, the temporary file deletion module can set the last modified time for the additional file chunk to null.

Still referring to FIG. 2, in some implementations, the temporary file deletion module compares the last modified times for the file chunk and each of the additional file chunks to determine a latest last modified time from among the last modified times. For example, if the file chunk is associated with two additional file chunks, the file chunk can be associated with a last modified time of 3:40 pm on Apr. 26, 2003, and the two additional file chunks can be associated with last modified times of 10:20 am, and 1:30 pm on Apr. 27, 2003 respectively. The temporary file deletion module can compare the three modification times to determine that 1:30 pm on Apr. 27, 2003 is the latest last modified time.

In some implementations, upon determining a latest last modified time from among the last modified times, the temporary file deletion module uses the latest last modified time to calculate an elapsed time for the file chunk. The elapsed time is calculated by subtracting the latest last modified time from the current time. For example, if the latest last modified time is Oct. 7, 2004 at 4:00 pm and the current time is Oct. 7, 2004 at 5:35 pm, the elapsed time is one hour and thirty-five minutes. The temporary file deletion module then compares the elapsed time to the time to live associated with the file chunk to determine if the elapsed time equals or exceeds the time to live. In some implementations, if the elapsed time is not equal to or greater than the time to live for the file chunk, the file chunk is not deleted.

In some implementations, upon determining that a file chunk has an elapsed time that is greater than or equal to a time to live for the file chunk, the temporary file deletion module deletes the file chunk. In some implementations, an indication that the file chunk has been deleted is provided to the master server 206. For example, the temporary file deletion module can indicate to the master server 206 that the file chunk has been deleted. The master server 206 then edits metadata 210 associated with the file chunk to indicate that the file chunk is deleted. In some implementations, if the elapsed time is greater than the time to live associated with the file chunk, the temporary file deletion module deletes each of the additional file chunks. In some implementations, the temporary file deletion module directly deletes each of the additional file chunks. In some implementations, the temporary file deletion module sends an indication that each of the file chunks should be deleted to each of the respective chunk servers on which the additional file chunks are located.

In some implementations, the temporary file deletion module sends an indication that each of the file chunks is to be deleted to the master server 206. The master server can then contact each of the respective chunk servers on which the additional file chunks are located to indicate that the file chunks are to be deleted. In some implementations, the master server 206 edits metadata 210 associated with the additional file chunks to indicate that the additional file chunks are deleted. In some implementations, the additional file chunks are deleted using any of the previously described deletion methods. For example, a path name for each of the additional file chunks can be changed to a hidden name. In some implementations, if the master server 206 determines that all of the file chunks of a file are deleted, then the master server 206 can determine that the file is deleted. In such circumstances, the master server 206 can edit metadata 210 associated with the file to indicate that the file is deleted.

Figure 3:
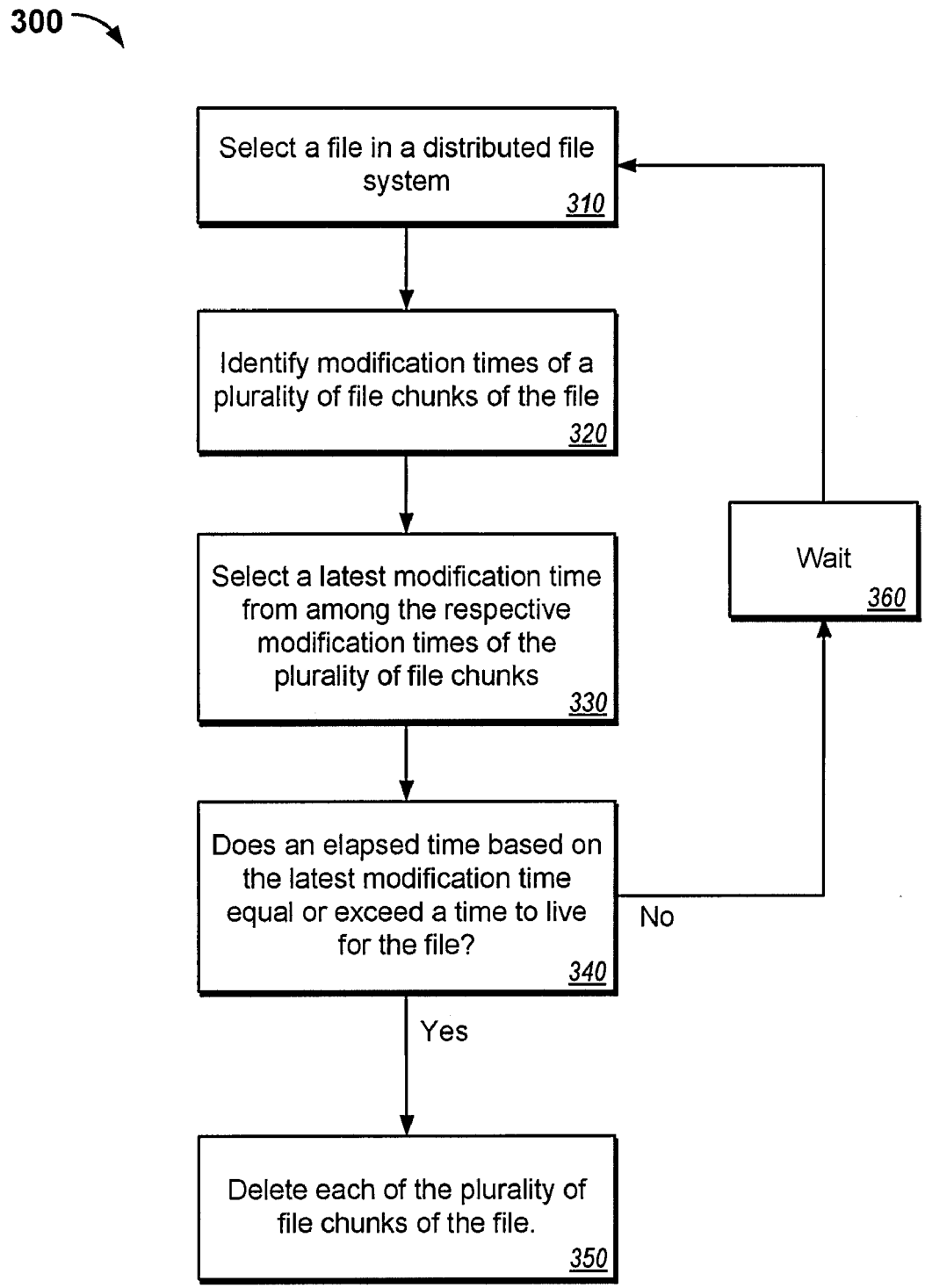
FIG. 3 shows a flowchart of a method for deleting a temporary file of a distributed file system.

Referring now to FIG. 3, some implementations of a process 300 for deleting a temporary file include a step 310 that selects a file in a distributed file system (e.g., 202). The file can be associated with a time to live that is derived from a path name of the file. The path name includes the name of the file as well as directory names of directories arranged hierarchically above the file. For example, referring to FIG. 1, the file system directory 102 can be part of a distributed file system and the file 120 can be selected. A time to live for the file 120 can be extracted from the path name 110. In the example depicted in FIG. 1, the path name includes a plurality of character string segments. One of the character string segments is "ttl=36." This indicates that a time to live for the file 120 is 36 hours.

In some implementations, the file is divided into a plurality of file chunks that are distributed among a plurality of servers, for example, referring to FIG. 2, the file can be divided into first and second chunks. The first chunk can be stored by the chunk server 204a and the second chunk can be stored by the chunk server 204b.

Step 320 identifies modification times for each of the plurality of file chunks of the file. For example, referring to FIG. 2, metadata 210 stored by the master server 206 can include modification times indicating when each of the plurality of file chunks was last modified. The master server 206 can extract the modification times for each of the plurality of file chunks from the metadata 210. As another example, the modification times for each of the plurality of file chunks is stored by chunk servers on which each of the plurality of file chunks is located. The chunk servers provide the modification times for the plurality of file chunks.

Step 330 selects a latest modification time from among the respective modification times of the plurality of file chunks. For example the file can be divided into four file chunks with respective modification times of 4:30 pm, 1:37 pm, 11:15 am, and 7:30 pm, all on Jun. 3, 2001. In this example, 7:30 pm can be identified as the latest modification time.

Step 340 determines if an elapsed time based on the latest modification time is equal to or exceeds a time to live for the file. The elapsed time calculated, for example, by subtracting the latest modification time from the current time. Following the example above, if the current time is 9:00 pm on Jun. 4, 2001 then the elapsed time is 25 hours and 30 minutes. The calculated elapsed time is then compared to the time to live for the file. If the elapsed time does not equal or exceed the time to live for the file, the process 300 performs step 360. Step 360 waits a predetermined period of time before returning to step 310 of the process 300. For example, the process 300 can wait for a period of 12 hours before repeating step 310. Alternatively, the process 300 can continue at step 310 after an event occurs such as, for example, an indication from operating system software that remaining disk space has diminished below a threshold, or the process 300 can continue during system idle times.

If the elapsed time equals or exceeds the time to live for the file, step 350 is performed. Step 350 deletes each of the plurality of file chunks of the file. In some implementations, each chunk server on which the plurality of file chunks are stored deletes the respective file chunk stored on the chunk server. For example, referring to FIG. 2, the chunk server 204a can delete a file chunk associated with a file for which the elapsed time equals or exceeds the time to live for the file. In some implementations, metadata associated with each file chunk is edited to indicate that the file chunk is deleted. For example, referring to FIG. 2, the master server 206 edits metadata 210 associated with a deleted file chunk to indicate that the file chunk has been deleted. In some implementations, a file chunk or file is deleted by changing the path name of the file chunk or file to a hidden name. In some implementations, when the elapsed time for a file exceeds the time to live for the file, the file is deleted and an indicator of the file (e.g. a file name) is added to a deleted files list.

Figure 4:
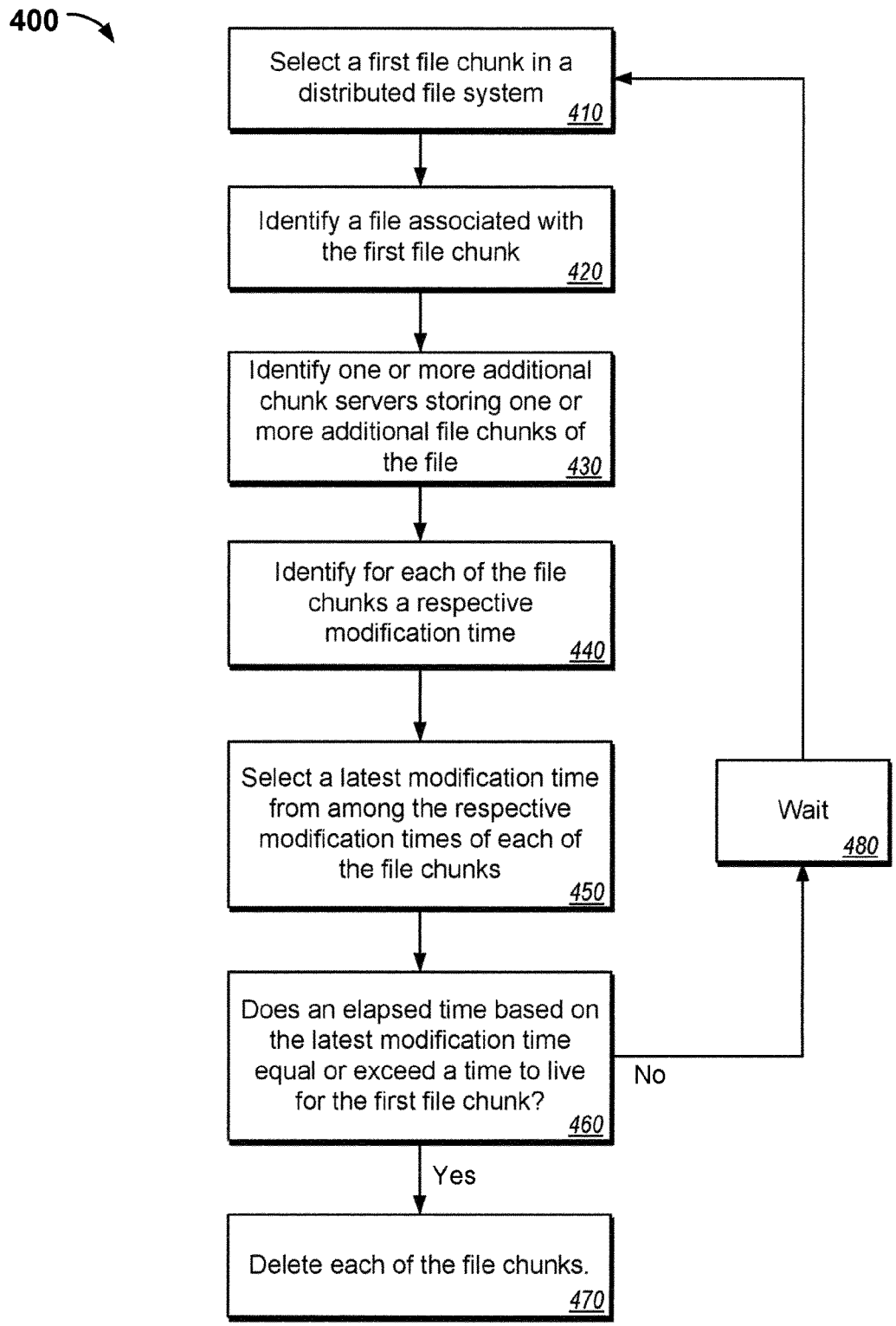
FIG. 4 shows a flowchart of a method for deleting a temporary file chunk of a distributed file system.

Referring now to FIG. 4, some implementations of a process 400 for deleting a temporary file chunk include a step 410 that selects a first file chunk in a distributed file system. For example, referring to FIG. 2, a file chunk stored by the chunk server 204b can be selected. The first file chunk is a portion of a file and can be associated with a time to live. In some implementations, the time to live is derived from a path name associated with the first file chunk or the name of a directory that contains the first file chunk. The path name includes the name of the file as well as directory names of directories arranged hierarchically above the file. For example, referring to FIG. 1, the path name 110 includes a character string of "ttl=36" indicating that files, directories and file chunks contained within the file system directory 102 have a time to live of 36 hours. In some implementations, the first file chunk is associated with a modification time indicating when the first file chunk was last modified.

Step 420 identifies a file associated with the first file chunk. For example, referring to FIG. 2, a request that includes a chunk handle for the first file chunk is sent to the master server 206; the master server 206 identifies a file associated with the first file chunk. As another example, referring to FIG. 1, the file 118 can be identified as the file which the first file chunk is a file chunk of.

Step 430 identifies one or more additional chunk servers storing one or more additional file chunks of the file. For example, referring to FIG. 2, if the first file chunk is stored by the chunk server 204b, the chunk server 204a can be identified as storing an additional file chunk of the file. In some implementations, the additional chunk servers are identified using server IDs and the additional file chunks are identified using chunk handles.

Step 440 identifies a respective modification time for each of the file chunks. For example, referring to FIG. 2, the metadata 210 stored by the master server 206 can include modification times for each of the file chunks. The master server 206 extracts modification times for each of the file chunks from the metadata 210. As another example, modification times is identified by sending requests to each chunk server on which the file chunks are stored. Each chunk server provides a modification time for the file chunk stored on that chunk server.

Step 450 selects a latest modification time from among the respective modification times of each of the file chunks. For example, there can be a total of three file chunks associated with the file having respective modification times of 8:30 am, 1:37 pm, and 5:20 pm all on May 10, 2001. In this example, 5:20 pm can be identified as the latest modification time.

Step 460 determines if an elapsed time based on the latest modification time is equal to or exceeds a time to live for the first file chunk. The elapsed time is calculated, for example, by subtracting the latest modification time from the current time. Following the example above, if the current time is 9:00 pm on May 10, 2001 then the elapsed time is 27 hours and 40 minutes. The calculated elapsed time is then compared to the time to live for the first file chunk. If the elapsed time does not equal or exceed the time to live for the first file chunk, the process 400 performs step 480. Step 480 waits a predetermined period of time before returning to step 410 of the process 400. For example, the process 400 can wait for a period of 8 hours before repeating step 410. Alternatively, the process 400 can continue at step 410 after an event occurs such as, for example, an indication from operating system software that remaining disk space has diminished below a threshold, or the process 400 can continue during system idle times.

If the elapsed time equals or exceeds the time to live for the first file chunk, step 470 is performed. Step 470 deletes each of the file chunks. In some implementations, each chunk server on which the file chunks are stored deletes the respective file chunk stored on the chunk server. For example, referring to FIG. 2, the chunk server 204a can delete a file chunk for which the elapsed time equals or exceeds the time to live for the file chunk. In some implementations, metadata associated with each file chunk is edited to indicate that the file chunk is deleted. For example, referring to FIG. 2, the master server 206 can edit metadata 210 associated with a deleted file chunk to indicate that the file chunk has been deleted. In some implementations, a file chunk or file is deleted by changing the path name of the file chunk or file to a hidden name. In some implementations, when the elapsed time for a file chunk exceeds the time to live for the file chunk, the file chunk is deleted and an indicator of the file chunk (e.g. a file name) is added to a deleted file chunks list. In some implementations, if it is determined that all of the file chunks of a file are deleted, then the file is deleted. For example, referring to FIG. 2, if the master server 206 determines that all of the file chunks of a file are deleted, then the master server 206 can determine that the file is deleted. In such circumstances, the master server 206 can edit metadata 210 associated with the file to indicate that the file is deleted.

Figure 5:
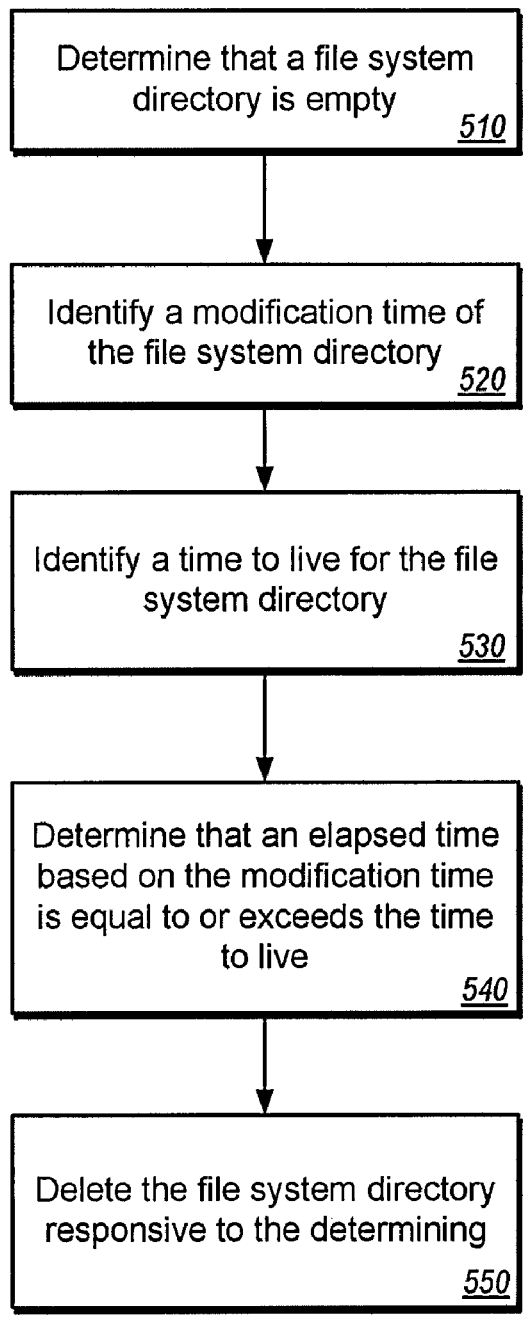
FIG. 5 shows a flowchart of a method for deleting a file system directory.

Referring now to FIG. 5, some implementations of a process 500 for deleting a file system directory include a step 510 that determines that a file system directory is empty. For example, referring to FIG. 1, the directory 122 can include a temporary file that is deleted. Upon deletion of the temporary file, the directory 122 is scanned to determine if other files are contained within the directory 122. If there are no files contained within the directory 122, it is determined that the directory 122 is empty. As another example, referring to FIG. 2, the chunk server 204b can store a file chunk that is deleted. Upon deletion of the file chunk, a file system directory in which the file chunk had been contained is scanned to determine if any additional files are contained within the file system directory. If there are no files contained within the file system directory, it is determined that the file system directory is empty. In some implementations, a directory that contains one or more hidden files but no non-hidden files is determined to be an empty directory. In other implementations, a directory that contains one or more hidden files is determined to not be an empty directory.

Step 520 identifies a modification time of the file system directory. In some implementations, the modification time for a directory indicates the last time a file or subdirectory contained within the file system directory was modified, created, or deleted. In some implementations, when a temporary file or file chunk contained within a file system directory is deleted, for example, by a temporary file deletion module, the modification time for the file system directory is not changed.

Step 530 identifies a time to live for the file system directory. In some implementations, the time to live for a file system directory is extracted from metadata associated with the file system directory. In some implementations, the time to live for a file system directory is extracted from a path name associated with the file system directory. For example, referring to FIG. 1, the directory 122 is contained within the file system directory 102 having the path name 110. The path name 110 includes a character string "ttl=36" indicating that files, file chunks, and directories contained within the file system directory 122 have a time to live of 36 hours. In some implementations, the time to live for the file system directory is derived from the directory name of the file system directory. Following the example above, a time to live of 36 hours can be determined for the file system directory 102 since the directory name of the file system directory is "ttl=36."

Step 540 determines that an elapsed time based on the modification time is equal to or exceeds the time to live. The elapsed time is calculated, for example, by subtracting the modification time of the file system directory from the current time. For example, if the modification time for the file system directory is 8:00 am and the current time is 8:00 pm on the same day, the elapsed time is 12 hours. The elapsed time is compared to the time to live for the file system directory to determine if the elapsed time equals or exceeds the time to live. For example, if the time to live for a file system directory is 2 days and the elapsed time is 2 days, 4 hours and 25 minutes, the elapsed time is determined to exceed the time to live.

Step 550 deletes the file system directory responsive to the determining. If the elapsed time is greater than or equal to the time to live for the file system directory, the file system directory is deleted. In some implementations, deleting the file system directory includes changing the name of the file system directory to a hidden name. In some implementations, deleting the file system directory includes editing metadata associated with the file system directory to indicate that the file system directory is deleted. For example, referring to FIG. 2, a file system directory located on the chunk server 204*a* is deleted. Metadata 210 stored by the master server 206 can be edited to indicate that the file system directory is deleted.

Figure 6:
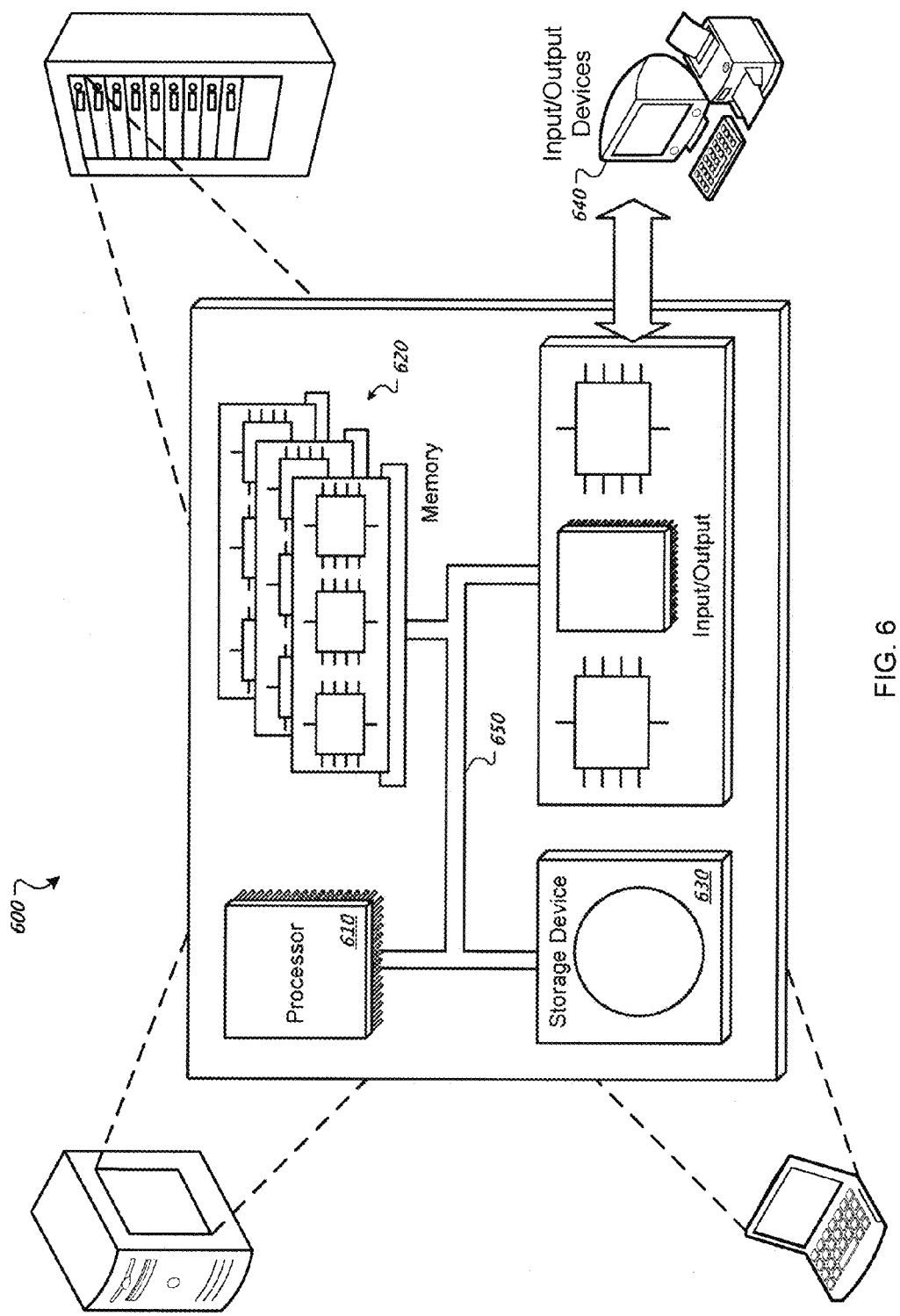
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 660. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method comprising:
   selecting a file having a path name in a distributed file system, wherein the file is divided into a plurality of chunks that are distributed among a plurality of servers, wherein each chunk has a modification time indicating when the chunk was last modified, and wherein at least two of the modification times are different;
   identifying a user profile associated with the file;
   determining a memory space storage quota usage for the user profile;
   deriving a file time to live for the file from the path name;
   determining a weighted file time to live for the file by reducing the file time to live by an offset, where the offset is determined by multiplying the file time to live by a percentage of memory space storage quota used by the user profile;
   selecting a latest modification time from the modification times of the plurality of chunks;

determining that an elapsed time based on the latest modification time is equal to or exceeds the weighted file time to live; and deleting all of the chunks of the file responsive to the determining.

2. The method of claim 1 in which the file time to live is encoded in the path name.

3. The method of claim 1 in which the file path name includes a textual representation of the file time to live.

4. The method of claim 1 in which deleting further comprises changing the file path name to a hidden path name.

5. The method of claim 1 in which determining is performed at regular intervals.

6. The method of claim 1, further comprising adding an indicator of the file to a deleted files list.

7. The method of claim 1, further comprising:

after deleting all of the chunks, determining if a file system directory in which the file had been located before deletion is empty; and if the file system directory is determined to be empty,
identifying a modification time of the file system directory;
identifying a time to live for the file system directory;
determining that an elapsed time based on the modification time of the file system directory is equal to or exceeds the time to live for the file system directory; and
deleting the file system directory responsive to the determining.

8. The method of claim 1, further comprising:

before deleting any of the chunks, presenting a prompt to a user indicating that the elapsed time is equal to or greater than the weighted time to live;

receiving an input from the user indicating that the file should be deleted; and deleting all of the chunks after receiving the input that the file should be deleted.

9. A computer-implemented method comprising:

selecting a first file chunk stored on a chunk server of a distributed file system wherein the first file chunk is associated with a file time to live, wherein the first file chunk is a portion of a file, and wherein the first file chunk has a modification time indicating when the first file chunk was last modified;

identifying the file associated with the first file chunk;

identifying one or more additional chunk servers storing one or more additional file chunks of the file;

identifying for each of the additional file chunks a modification time indicating when the additional file chunk was last modified, wherein at least two of the modification times of the first file chunk and additional file chunks are different;

identifying a user profile associated with the file;

determining a memory space storage quota usage for the user profile;

determining a weighted file time to live for the file by reducing the file time to live by an offset, where the offset is determined by multiplying the file time to live by a percentage of memory space storage quota used by the user profile;

selecting a latest modification time from the modification times of the first and additional file chunks;

determining that an elapsed time based on the latest modification time is equal to or exceeds the weighted file time to live; and deleting all of the file chunks responsive to the determining.

10. The method of claim 9 in which identifying one or more additional chunk servers further comprises sending a request to a master server of the distributed file system; and receiving a response from the master server, wherein the response indicates the one or more additional chunk servers.

11. The method of claim 10 in which identifying for each of the file chunks a modification time further comprises receiving an indication of the modification time for each of the additional file chunks from the master server.

12. The method of claim 10 in which deleting further comprises editing metadata stored by the master server to indicate that the file is deleted.

13. The method of claim 9 in which the time to live is derived from a path name associated with the first file chunk.

14. The method of claim 13 in which the path name associated with the first file chunk includes a plurality of segments and one of the segments contains a textual representation of the time to live.

15. The method of claim 9 in which deleting further comprises editing metadata associated with the file chunks to indicate that the file chunks are deleted.

16. The method of claim 9 in which identifying for each of the file chunks a modification time further comprises sending a request for each of the modification times of the one or more additional file chunks to each of the one or more respective additional chunk servers.

17. A computer program product tangibly embodied in a machine-readable storage device and comprising instructions that, when executed, operate to cause a computer to perform operations comprising:

selecting a file having a path name in a distributed file system, wherein the file is divided into a plurality of chunks that are distributed among a plurality of servers, wherein each chunk has a modification time indicating when the chunk was last modified, and wherein at least two of the modification times are different;

identifying a user profile associated with the file;

determining a memory space storage quota usage for the user profile;

deriving a file time to live for the file from the path name;

determining a weighted file time to live for the file by reducing the file time to live by an offset, where the offset is determined by multiplying the file time to live by a percentage of memory space storage quota used by the user profile;

selecting a latest modification time from the modification times of the plurality of chunks;

determining that an elapsed time based on the latest modification time is equal to or exceeds the weighted file time to live; and deleting all of the chunks of the file responsive to the determining.

18. A computer program product tangibly embodied in a machine-readable storage device and comprising instructions that, when executed, operate to cause a computer to perform operations comprising:

selecting a first file chunk stored on a chunk server of a distributed file system wherein the first file chunk is associated with a file time to live, wherein the first file chunk is a portion of a file, and wherein the first file chunk has a modification time indicating when the first file chunk was last modified;

identifying the file associated with the first file chunk;

identifying one or more additional chunk servers storing one or more additional file chunks of the file;

identifying for each of the additional file chunks a modification time indicating when the additional file chunk was last modified, wherein at least two of the modification times of the first file chunk and additional file chunks are different;

identifying a user profile associated with the file;

determining a memory space storage quota usage for the user profile;

determining a weighted file time to live for the file by reducing the file time to live by an offset, where the offset is determined by multiplying the file time to live by a percentage of memory space storage quota used by the user profile;

selecting a latest modification time from the modification times of the first and additional file chunks;

determining that an elapsed time based on the latest modification time is equal to or exceeds the weighted file time to live; and deleting all of the file chunks responsive to the determining.

19. A system comprising:

one or more computers and one or more storage devices storing instructions that are operable, when executed by the one or more computers, to cause the one or more computers to perform operations comprising: selecting a file having a path name in a distributed file system, wherein the file is divided into a plurality of chunks that are distributed among a plurality of servers, wherein each chunk has a modification time indicating when the chunk was last modified, and wherein at least two of the modification times are different;

identifying a user profile associated with the file;

determining a memory space storage quota usage for the user profile;

deriving a file time to live for the file from the path name;

determining a weighted file time to live for the file by reducing the file time to live by an offset, where the offset is determined by multiplying the file time to live by a percentage of memory space storage quota used by the user profile;

selecting a latest modification time from the modification times of the plurality of chunks;

determining that an elapsed time based on the latest modification time is equal to or exceeds the weighted file time to live; and deleting all of the chunks of the file responsive to the determining.

20. A system comprising:

one or more computers and one or more storage devices storing instructions that are operable, when executed by the one or more computers, to cause the one or more computers to perform operations comprising:

selecting a first file chunk stored on a chunk server of a distributed file system wherein the first file chunk is associated with a file time to live, wherein the first file chunk is a portion of a file, and wherein the first file chunk has a modification time indicating when the first file chunk was last modified;

identifying the file associated with the first file chunk;

identifying one or more additional chunk servers storing one or more additional file chunks of the file;

identifying for each of the additional file chunks a modification time indicating when the additional file chunk was last modified, wherein at least two of the modification times of the first file chunk and additional file chunks are different;

identifying a user profile associated with the file;

determining a memory space storage quota usage for the user profile;

determining a weighted file time to live for the file by reducing the file time to live by an offset, where the offset is determined by multiplying the file time to live by a percentage of memory space storage quota used by the user profile;

selecting a latest modification time from the modification times of the first and additional file chunks;

determining that an elapsed time based on the latest modification time is equal to or exceeds the weighted file time to live; and deleting all of the file chunks responsive to the determining.

* * * * *